United States Patent [19]

Laughlin

[11] Patent Number: 5,067,351

[45] Date of Patent: Nov. 26, 1991

[54] MAGNETOHYDRODYNAMIC ANGULAR RATE SENSOR FOR MEASURING LARGE ANGULAR RATES

[75] Inventor: Darren R. Laughlin, Albuquerque, N. Mex.

[73] Assignee: Applied Technology Associates, Inc., Albuquerque, N. Mex.

[21] Appl. No.: 426,254

[22] Filed: Oct. 25, 1989

[51] Int. Cl.$^5$ .............................................. G01P 15/00
[52] U.S. Cl. ................................ 73/516 LM; 310/11; 324/163
[58] Field of Search ................... 73/516 LM, 505, 519; 310/11; 324/163

[56] References Cited

U.S. PATENT DOCUMENTS

| | | | |
|---|---|---|---|
| 2,753,469 | 7/1956 | Statham et al. | 73/516 LM |
| 3,176,520 | 4/1965 | Aske | 73/516 |
| 3,238,787 | 3/1966 | Riordan | 73/516 |
| 3,306,113 | 2/1967 | Tuccinardi | 73/516 LM |
| 3,771,371 | 11/1973 | Albert | 73/516 LM |
| 4,232,554 | 11/1980 | Benedetto et al. | 73/577 |
| 4,716,763 | 1/1988 | Moffatt et al. | 73/505 |
| 4,718,276 | 1/1988 | Laughlin | 73/516 LM |
| 4,726,227 | 2/1988 | Moffatt et al. | 73/505 |
| 4,764,908 | 8/1988 | Greer, Jr. | 367/178 |

Primary Examiner—Tom Noland
Assistant Examiner—Craig Miller
Attorney, Agent, or Firm—Pollock, VandeSande & Priddy

[57] ABSTRACT

An electronic motion sensor is described, wherein a cavity formed in a case of high flux density material supports a permanent magnet at the bottom. The permanent magnet has a north/south pole orientation in line with the cavity axis. A circular channel is located above, having an axis coincident with the cavity axis and which is filled with mercury. A center contact post is located long the cavity axis in contact with the mercury, extending upwards through the top of the channel. An amplifier circuit supported on a header of high flux density material is placed on top of the channel. The amplifier amplifies the potential difference between the center contact and the case. The header effectively seals the cavity of the case.

7 Claims, 3 Drawing Sheets

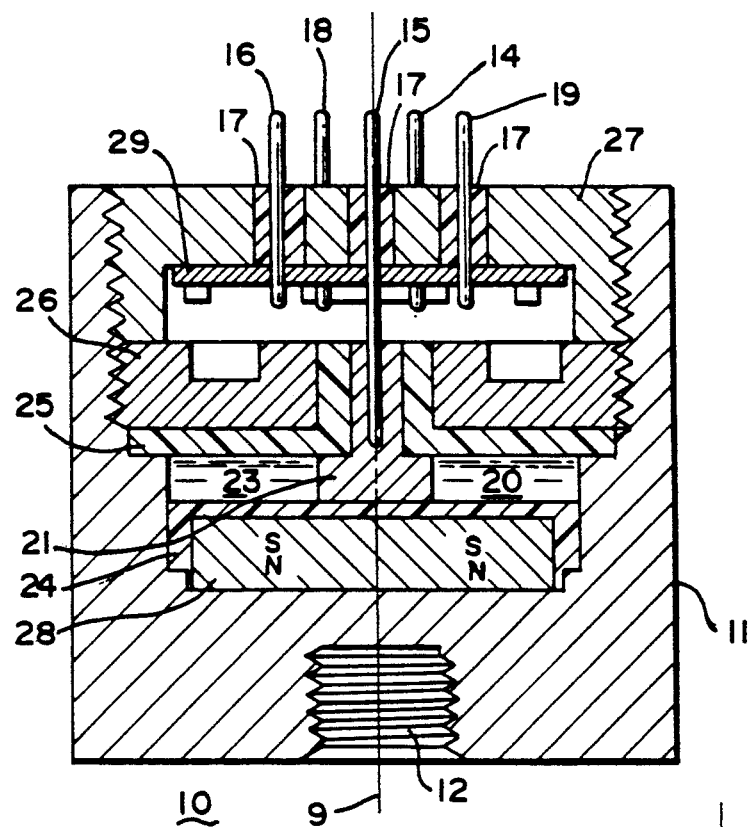
FIG. 1
FIG. 2
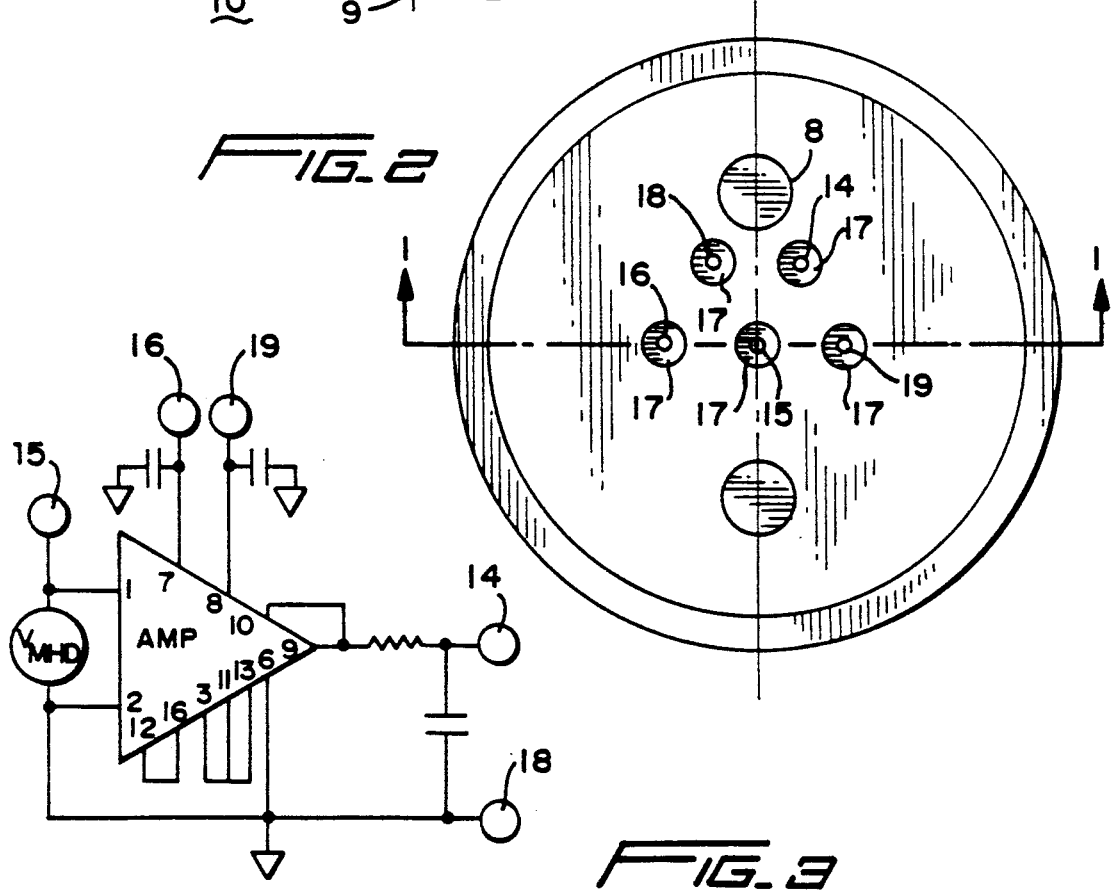
FIG. 3

MAGNETOHYDRODYNAMIC ANGULAR RATE SENSOR FOR MEASURING LARGE ANGULAR RATES

The present invention relates to the angular rate sensor art. Specifically, an electronic angular rate sensor is described having an increased bandwidth, and designed to measure large angular rates in a high shock environment.

The present invention is a further development of angular motion sensors of the type described in my previous U.S. Pat. No. 4,718,276. This patent describes a sensor which measures angular velocity rate about a rotational axis. The sensor includes an annular channel of conductive fluid centered about a central axis in which angular rate is measured. A magnetic field is established across the conductive fluid, which functions as the inertial proof mass. Rotation of the case with respect to the fluid is sensed as a current change in an adjacent, segmented electrode due to magnetohydrodynamic effects. The segmented electrode also constitutes the primary winding of a transformer. The secondary winding of the transformer produces an amplified voltage potential proportional to the angular rate about the transducer's sensitive axis. The device described in this patent is very advantageous in applications where very low level angular rates are measured.

There are, however, some disadvantages associated with the device described in this earlier patent. Among them includes sensitivity to the changes in magnetic field which occurs upon impact of the sensor. A slight deformation of the casing would result in EMF changes, inducing an unwanted voltage in the secondary of the transformer.

These extraneous voltages are not related to the angular rate measurement, and impair the ability to make an accurate angular rate measurement.

Additionally, some difficulties are encountered with the earlier device in keeping extraneous fields outside the sensor from inducing unwanted and unrelated voltages into the transformer winding, further impairing device accuracy.

The present invention seeks to overcome these difficulties. The new rate sensor invention is used in making impact measurements, in particular in automotive crash testing, wherein dummies (anthropomorphic test devices) simulating humans are used to assess potential injuries from car crashes, specifically, the angular rate measurements of the dummy's head during a crash. The sensors are subject to high impact shock, often several hundred G's.

SUMMARY OF THE INVENTION

It is an object of this invention to provide an electronic angular rate sensor having a high immunity to stray exterior electromagnetic fields by not incorporating a secondary winding.

It is a more specific object of this invention to avoid the effects of high impact shock on sensor accuracy by not including a secondary winding or a transformer core, which is somewhat sensitive to large accelerations.

These and other objects of the invention are provided by an electronic angular rate sensor formed in a metallic case having a high magnetic flux density. The metallic case provides substantial immunity to external magnetic effects for the sensor. The metallic case includes within it an circular channel disposed about a measurement axis. The circular channel includes an conductive fluid which, in a preferred embodiment, is mercury, which remains inertially stationary within the channel during acceleration and deceleration of the sensor case.

A magnet is located below the channel which produces a constant magnetic flux through the conductive fluid. A conductive center post is located on the measurement axis, contacting the electrically conductive fluid. The fluid and conductive post are electrically insulated from the magnet.

Located above the channel is a channel cap which seals the fluid along the top edge of the channel. An amplifying circuit having positive and negative input connections connected to the metallic case and the center post is disposed above the channel, which makes electrical contact with the center post electrode. During acceleration of the device about the measurement axis, a potential is induced between the case and center post from magnetohydrodynamic effects representing the angular rate of the device.

The entire package is such that a minimum number of connections are needed to the device. A stud can be located at one end thereof, or a threaded hole to accommodate mounting to a test article for measuring angular rate.

BRIEF DESCRIPTION OF THE FIGURES

FIG. 1 is a section view of a preferred embodiment of the sensor in accordance with the invention.

FIG. 2 illustrates a top view of the connections to the sensor of FIG. 1.

FIG. 3 is a schematic for the amplifying circuit of the sensor of FIG. 1.

DESCRIPTION OF THE PREFERRED EMBODIMENT

Figure 4:
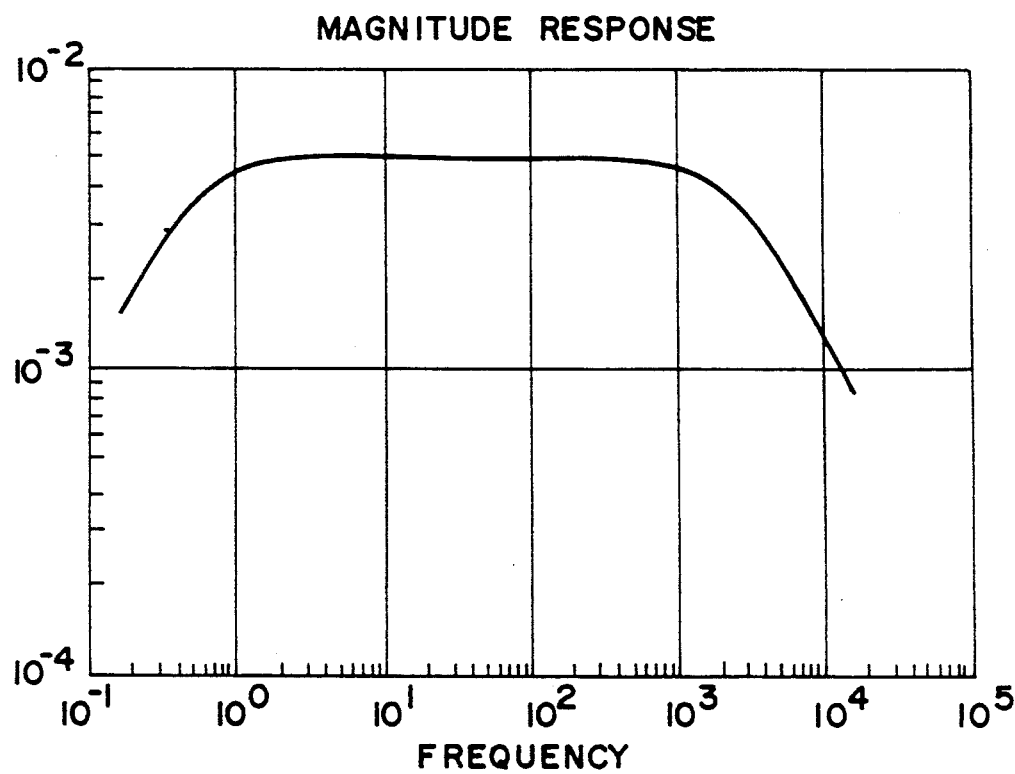
FIG. 4 illustrates the amplitude response for the sensor of FIG. 1.

Referring now to FIG. 1, there is illustrated a section view of a sensor in accordance with the preferred embodiment. The view illustrates a case 11 which seals the sensor from external magnetic influences, as well as prevents intrusion by any foreign substance.

The case 11 is selected from a material which exhibits a high magnetic saturation flux density. The case is generally cylindrical, having a diameter of 20.3 mm and a height of 19.1 mm. This material may be an iron cobalt alloy such as a vanadium permendur alloy or could be made from a nickel iron alloy. The material will essentially isolate the interior of the sensor from any external magnetic influences which might impair an accurate angular rate measurement. The case also functions as a closed magnetic circuit for the permanent magnet.

A threaded stud hole 12 is shown which is integral with the case 11. The threaded stud hole 12 permits quick mounting to an article on which angular rate measurements are to be made. The axis 9 of the threaded hole 12 coincides with the measurement axis of the sensor device 10. Thus, angular rate measurements about axis 9 are conveniently made. Of course, it is possible to use other fastening devices with the sensor of FIG. 1. For instance, a threaded stud could be provided affixed to the case 11 such that the transducer could be threaded into a threaded hole.

A permanent magnet 28 is placed at the bottom of a cavity within case 11. The permanent magnet 28 has a north/south orientation along the axis of the sensor device. The north pole is located at the base of the central cavity of the case 11. The magnet could also be inverted with the south pole located at the base. The only performance change would be the polarity of the voltage output, which is desired in some cases.

The magnet 28 may be a neodymium-boron-iron type NdFeB which is in the shape of a disc. The magnet selected in a preferred embodiment has an energy product of greater than 30-Megaoersteds ($MGO_e$). An insulating cap 24 is shown, which comprises epoxy, is potted over the magnet, to insulate the magnet from a channel 20 which comprises a fluid channel for mercury 23.

The fluid channel 20 is circular, having a central axis coincident with axis 9 of the sensor. A conductive center contact post 21 is shown residing on top of the insulating cap 24.

The channel 20 filled with mercury 23 is capped by a polycarbonate lid 25. As will become clear when the method for fabricating the preferred embodiment is discussed, this cap 25 may be of a poured epoxy material which seals the channel 20 with the center post 21.

An inner lid 26 is shown having threads which cooperate with outer threads located on the cavity formed in the case 11. When in place, the inner lid 26 will maintain the cap and center post 21 in place as well as seal the top of the channel.

Located above the inner lid 26 is a microelectronic circuit 29 which includes an amplifier having + and − inputs, as well as power supply terminals which require + and −15 volts. The integrated circuit 29 may be a thick film hybrid electronics circuit, mounted to an electronics header 27. The header 27 is threaded into the cavity of the case 11, via cooperating threads located on the outer periphery of the header 27. The header also includes a plurality of pins 14–16, and 18–19 which are glass insulated from the header 27 and case 11 with insulators 17, providing electrical contact with the sensor. One of the pins 15 has a diameter which permits it to be received in a bore within the center post 21. When header 27 is screwed in place, the center post 21 and pin 15 are electrically connected.

Outboard connections for the amplifier circuit are shown in FIG. 2. These include a center pin 15 as well as two output terminals for the amplifier 14 and 16, and two power supply pins 18 and 19. The center pin 15 is maintained to permit direct measurement of any potential appearing on center post 21 with respect to the inner case 11 and is used as a test point. Two holes 8 are shown which are chuck holes used to hold the header during thread cutting, and also for tightening the header when it is screwed into the case.

In operation, when angular accelerations are experienced about axis 9, the mercury in channel 23 will be remain inertially stationary about the sensitive axis within the circular channel 20. The relative annular rate $\dot{\phi}$ of the case with respect to the mercury produces a voltage potential between center post 21 and the case 11. This voltage potential can be described in accordance with the foregoing frequency rate formula:

$$\frac{V_{out}(s)}{\dot{\phi}(s)} = \left[\frac{B_o\,rws}{s + \frac{1}{\tau}}\right]\left[\frac{K_a}{RCS + 1}\right]$$

where $$\frac{K_a}{RCS + 1}$$

is the amplifying circuit or header 27 transfer function, and,

Bo is the mercury channel magnetic flux density,
r is the mercury channel root mean square radius,
w is the mercury channel effective width, $$\tau = \frac{v}{h^2}[1 + M^2], \text{ and}$$

where
$v$ is the kinematic viscosity of mercury,
h is the mercury channel effective height, and
M is the Hartmann number.
Ka is the amplifier gain.
s is the LaPlace variable.
$\dot{\theta}(s)$ is the input angular rate.

The sensor, as described by the above formula, requires that there be a magnetic flux generated across the channel. The so-called Hartmann number, M, is defined as $$M = \frac{B_o h}{\sqrt{\eta \rho v}}$$

where
$\eta$ is the resistivity of mercury, p1 $\rho$ is the density of mercury, and
$v$ is the kinematic viscosity of mercury.

The electrical schematic for the amplifier circuit is shown more particularly in FIG. 3. FIG. 3 illustrates two inputs of an instrumentation amplifier, the negative input of which is connected to the case 11 and the positive input of which is connected to the center post 21. The common connection for the amplifier 16 is a the case 11.

Figure 5:
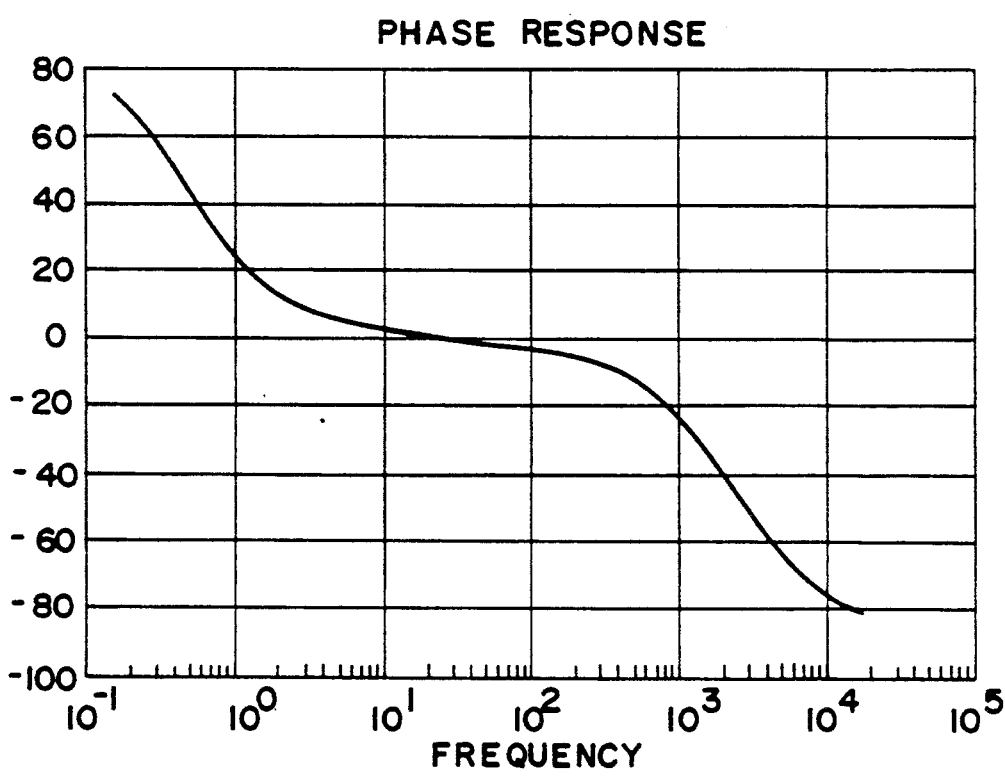
FIG. 5 illustrates the phase response for the sensor of FIG. 1.

Referring now to FIGS. 4 and 5, there is shown the frequency response for the device of FIG. 1. As can be seen from FIG. 4, the overall bandwidth of the device is greater than that of the sensor in the earlier-referenced U.S. patent. Removal of the transformer permits increase of the bandwidth at the expense of a loss in resolution for the device. The device has a lower corner frequency, thus improving the overall bandwidth of the device, particularly in the region of low frequency angular rates.

The phase response for the device is illustrated in FIG. 5. Angular rates within the 10 Hz. to several hundred Hz bandwidth experience virtually no phase delay. This is advantageous in providing a sensor requiring only minimum correction for phase offset in the instrumentation which is used to measure the output signal from the sensor device of FIG. 1.

The foregoing sensor is extremely compact as compared to the earlier developed sensor in the referenced patent, and also is less susceptible to extraneous magnetic influences. Upon impact of the sensor during crash testing of motor vehicles, dynamic forces on the case 11 does not result in any change of flux through a transformer winding, as was present in the earlier device since there are no secondary windings or transformers in this design. Thus, changes in magnetic flux through the transformer winding are not present, and no error current is induced as a result of slight deformations of the case 11 due to dynamic loads.

Figure 6:
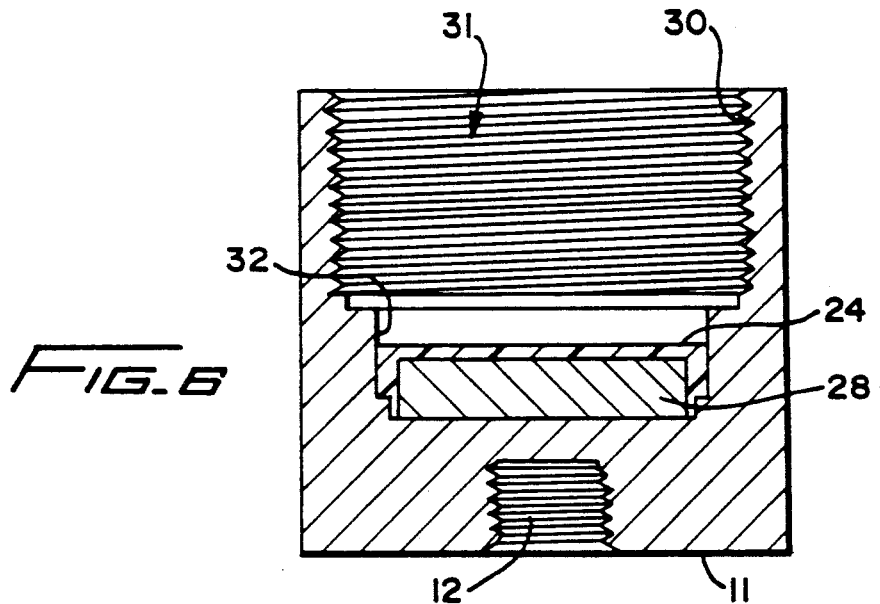
FIG. 6 illustrates a first process step in manufacturing the sensor of FIG. 1.
Figure 7:
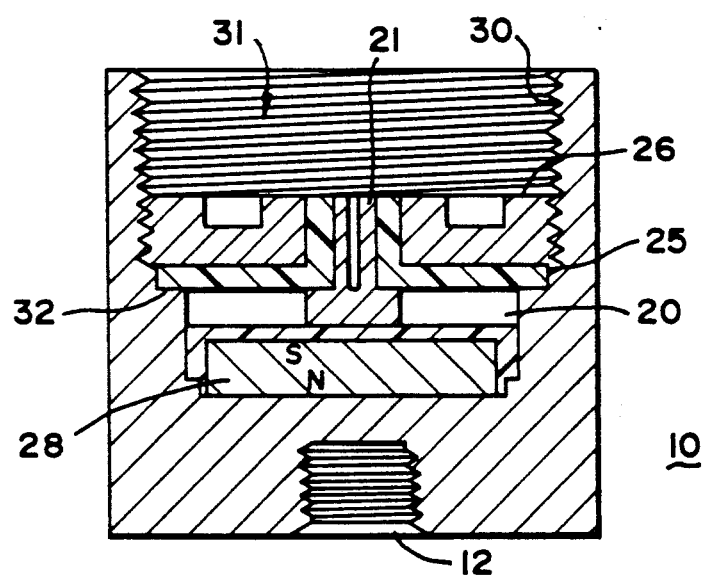
FIG. 7 illustrates a second process step for manufacturing the sensor of FIG. 1.
Figure 8:
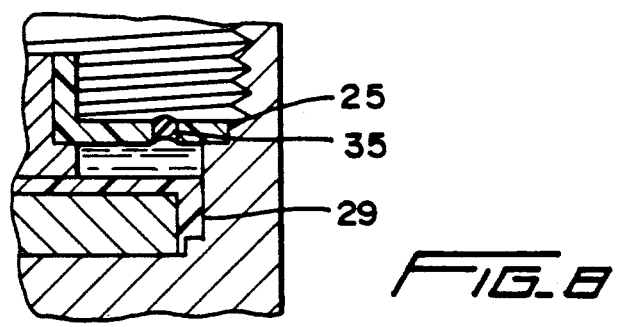
FIG. 8 illustrates a third process step in filling the mercury channel of the sensor of FIG. 1.

Fabrication of the sensor of FIG. 1 can be accomplished by following the process steps shown in FIGS. 6, 7 and 8.

Referring particularly to FIG. 6, there is shown the beginning steps of fabricating the sensor in accordance with FIG. 1. The case 11 and threaded hole 12 is shown to have an interior cavity 31. The interior cavity narrows at a ledge 33 near the bottom of the cavity. The cavity is threaded at 30 to facilitate closure of the cavity by the inner lid 26 and electronics header 27.

The magnet 28 is placed at the bottom of the cavity 31 with the north/south axis oriented in the direction of the measurement axis for the sensor, the north pole being at the bottom of the cavity 31. An epoxy cover 29 is shown which is poured over the magnet and machined to form an insulating layer over the magnet 28. The top surface of the epoxy cover 29 forms the bottom of the circular channel 20, bordered by the inner cavity wall 32.

Referring now to FIG. 7, there is shown center post 21 positioned over the epoxy cover 29, and held in place by a polycarbonate lid 25. The polycarbonate lid has an opening in which the center post 21 is pressed. The ledge associated with the narrowing of the cavity supports the lid 25 which is bonded to the ledge with an epoxy. An inner lid 26 is made of the same material as the case, and is screwed into the threads 30 provided on the upper portion of the cavity 31 after the channel 20 is filled with a conductive fluid. Center post 21 includes a bore which receives a pin 15.

The circular channel 20 formed within the sensor is filled with a conductive fluid. As can be seen in FIG. 8, a small hole is drilled into the polycarbonate lid 25 to permit mercury to be introduced into channel 20. With the inner lid removed, the sensor 10 may be placed in a vacuum jar and a vacuum drawn of approximately 1 Torr on the sensor. Using a small tubing, mercury is supplied from an exterior supply of mercury into the hole 35 provided in the polycarbonate lid 25. Once the channel 20 appears filled, the conduit supplying the mercury is removed from hole 35. The sensor is once again brought into a vacuum chamber which forces any air trapped within the channel 20 out through the opening 35. When the air is completely removed, the mercury forms an outer meniscus at the top of the channel 20. Removing the air is important in removing any cross axis acceleration components. The channel 20 is then sealed by introducing a drop of epoxy into the opening 35, which seals the channel 20.

The remaining fabrication of the device of FIG. 1 requires that the electronics header 27 be prepared by bonding a thick film electronic circuit 29, configured as in FIG. 3, to a central cavity of header 27. The header 27 includes outside threads for engaging thread 30 of the case 11. The header is also preferably of a high permeability material to assist in isolating the device from any stray magnetic fields. The header includes the five terminals of FIG. 2. The pins 14, 16, 18 and 19 are connected to the amplifier output terminal, the common connection of the amplifier, and the + and − power supply terminals of the amplifier, as illustrated in FIG. 3. Pin 15 extends the header 27 and bottoms out in the bore of center post 21 when header 27 is threaded into the cavity 31, making electrical contact therewith.

Thus, there is shown an embodiment of an angular rate sensor which has improved bandwidth and accuracy under high shock conditions. Those skilled in the art will recognize yet other embodiments of the invention as described more particularly by the claims which follow.

What is claimed is:

1. An electronic angular rate sensor comprising:
   a metallic case open at one end having a high magnetic flux density including a central cavity;
   a magnet located at the bottom of said case, having a north/south axis oriented in the direction of said cavity axis;
   an insulating member covering said magnet and sealing said magnet from the remaining portion of said cavity;
   a conductive center post having one end supported on said insulating member, extending along the axis of said cavity;
   a channel cap disposed in said cavity and spaced apart from said insulating member, forming a sealed channel with said insulating member and said metallic case, said channel containing mercury, said channel cap having a central opening through which said center post extends; and,
   an amplifying circuit mounted on a header which closes said cavity, having first and second input connections connected respectively to said metallic case and said center post, providing a voltage proportional to the angular rate of said metallic case about said central cavity axis.

2. The angular rate sensor of claim 1 further comprising a threaded mounting means integral with said case having a common axis with said central cavity axis.

3. The angular rate sensor of claim 1 wherein said case is a vanadium permendur alloy.

4. The angular rate sensor of claim 1 wherein said output voltage (frequency response) is proportional to $$\frac{V(s)}{\phi(s)} = \left[\frac{B_o\, rws}{s + \frac{1}{\tau}}\right]\left[\frac{K_a}{RCS + 1}\right]$$

where $$\frac{K_a}{RSC + 1}$$

is the amplifying circuit frequency response function, and, $B_o$ is the mercury channel magnetic flux density,
$r$ is the mercury channel root mean square radius,
$w$ is the mercury channel effective width, $$\tau = \frac{v}{h^2}[1 + M^2], \text{ and}$$

($\tau$ is the transducer-time constant in seconds), where
$v$ is the kinematic viscosity of mercury,
$h$ is the mercury channel effective height, and
$M$ is the Hartmann number for mercury.

5. An electronic angular rate sensor comprising:
a cylindrical metallic case open at one end having a high magnetic flux density including a central cavity therein;
a permanent magnet at the bottom of said cavity having a north/south axis oriented in the direction of said central cavity axis;
a conductive liquid channel disposed in said cavity above said permanent magnet and insulated from said magnet, said conductive liquid channel bounded on sides thereof by said cavity, forming an electrical contact therewith, and at the top thereof by a lid;
a center post extending through said lid into said conductive liquid channel, forming an electrode for said angular rate sensor; and,
an amplifier circuit supported on a header closing said cavity, said amplifier circuit having input connections connected to said center post and said case, said header sealing said central cavity, and supporting on an exterior thereof electrical connections for said amplifier circuit.

6. The angular rate sensor of claim 5 wherein a center pin extends through said header, and also contacts said center post.

7. The angular rate sensor of claim 5 wherein said permanent magnetic is insulated from said channel with an epoxy cover, and has a north pole at the bottom of said central cavity.

* * * * *